United States Patent
Hsiung

(10) Patent No.: US 7,609,835 B2
(45) Date of Patent: Oct. 27, 2009

(54) DIGITAL MEDIA CARTRIDGE SYSTEM AND METHOD

(76) Inventor: Ping Kang Hsiung, 423 Ocean Ave., Suite 6, Santa Monica, CA (US) 90402

(*) Notice: Subject to any disclaimer, the term of this patent is extended or adjusted under 35 U.S.C. 154(b) by 877 days.

(21) Appl. No.: 10/897,564

(22) Filed: Jul. 23, 2004

(65) Prior Publication Data

US 2005/0063540 A1 Mar. 24, 2005

Related U.S. Application Data

(60) Provisional application No. 60/560,846, filed on Apr. 9, 2004, provisional application No. 60/509,005, filed on Oct. 6, 2003, provisional application No. 60/489,418, filed on Jul. 23, 2003.

(51) Int. Cl.
 *G06F 11/30* (2006.01)
 *G06F 17/00* (2006.01)
 *H04N 7/167* (2006.01)

(52) U.S. Cl. ............ 380/217; 380/201; 713/193; 463/29; 463/43

(58) Field of Classification Search ............ 463/43, 463/44; 713/189, 193, 190; 380/216, 217
See application file for complete search history.

(56) References Cited

U.S. PATENT DOCUMENTS

| | | | |
|---|---|---|---|
| 6,468,160 B2 | 10/2002 | Eliott | |
| 7,290,236 B1* | 10/2007 | Flaherty et al. | 716/16 |
| 2002/0086734 A1* | 7/2002 | Krishnan et al. | 463/43 |
| 2003/0032486 A1* | 2/2003 | Elliott | 463/43 |
| 2006/0148569 A1* | 7/2006 | Beck | 463/43 |

* cited by examiner

*Primary Examiner*—Gilberto Barron, Jr.
*Assistant Examiner*—Abdulhakim Nobahar
(74) *Attorney, Agent, or Firm*—Christie, Parker & Hale, LLP.

(57) ABSTRACT

A digital media cartridge contains both a controller and memory where the memory stores a digital representation of video and sound in compressed, encrypted form. The controller reads the digital representation, decompresses and decrypts it, converts it into analog video and audio and outputs the analog video and audio to a host device into which the cartridge is inserted. The analog video and audio output are displayed on the screen of the host device and reproduced by speakers or headphones of the host device, respectively, without further processing of the video and audio signals being necessary by the host device. Besides video and audio, the digital media cartridge can also store and execute games that use the user input and display screen of the host device.

15 Claims, 7 Drawing Sheets

DIGITAL MEDIA CARTRIDGE SYSTEM AND METHOD

CROSS-REFERENCE TO RELATED APPLICATION(S)

This application is based upon and claims priority to U.S. Provisional Application No. 60/489,418, filed Jul. 23, 2003, U.S. Provisional Application No. 60/509,005, filed Oct. 6, 2003 and U.S. Provisional Application No. 60/560,846, filed Apr. 9, 2004, which are both incorporated by reference as if set forth in full herein.

SUMMARY OF THE INVENTION

A digital media cartridge contains both a controller and memory where the memory stores a digital representation of video and sound in compressed, encrypted form. In one embodiment, the controller reads the digital representation, decompresses and decrypts it, converts it into analog video and audio and outputs the analog video and audio to a host device into which the cartridge is inserted. The analog video and audio output are displayed on the screen of the host device and reproduced by speakers or headphones of the host device, respectively, without further processing of the video and audio signals being necessary by the host device.

The new cartridge can be inserted, for example, into a Game Boy Advance unit and bypass the controller in the Game Boy Advance unit and use the Game Boy Advance unit's display and speaker to show the video and audio output by the cartridge. Digital media cartridges can be made in any form factor and with any connectors to allow them to be connected to a variety of devices that have screens and speakers to convert such devices into video playback devices.

One advantage of certain embodiments of the digital media cartridge is that because it contains all of the video signal creation hardware and software, new technology can be built into later versions of the cartridge without having to change the socket and/or circuitry on the device with the screen into which the cartridge is plugged. Thus, standard televisions could include a socket to receive digital media cartridges— the socket and associated hardware being very cheap to manufacture. At the beginning it may only be economical to produce standard definition video stored on these cartridges, but as technology advances, including improved compression technology and the cost of memory and other components goes down, it may become economical to produce cartridges that output higher definition video or cheaper to produce standard definition video cartridges. No changes though, would have to be made to the television with the built in socket to take advantage of the new technology as it is all contained in the cartridge, provided the television screen is capable of display a video resolution as good as the video output from the digital media cartridge. Further, should the encryption technique be broken or otherwise compromised, new cartridges can be immediately produced that use completely new encryption techniques so that damage from the breaking of the encryption can be minimized. Additionally, slightly different encryption techniques can be used so that the exact encryption technique is unique to the cartridges that contain a particular video program or movie. Thus, if the encryption is compromised for one particular program or movie, the same decryption technique cannot be utilized for different content stored on the cartridges.

DETAILED DESCRIPTION OF THE INVENTION

Figure 1:
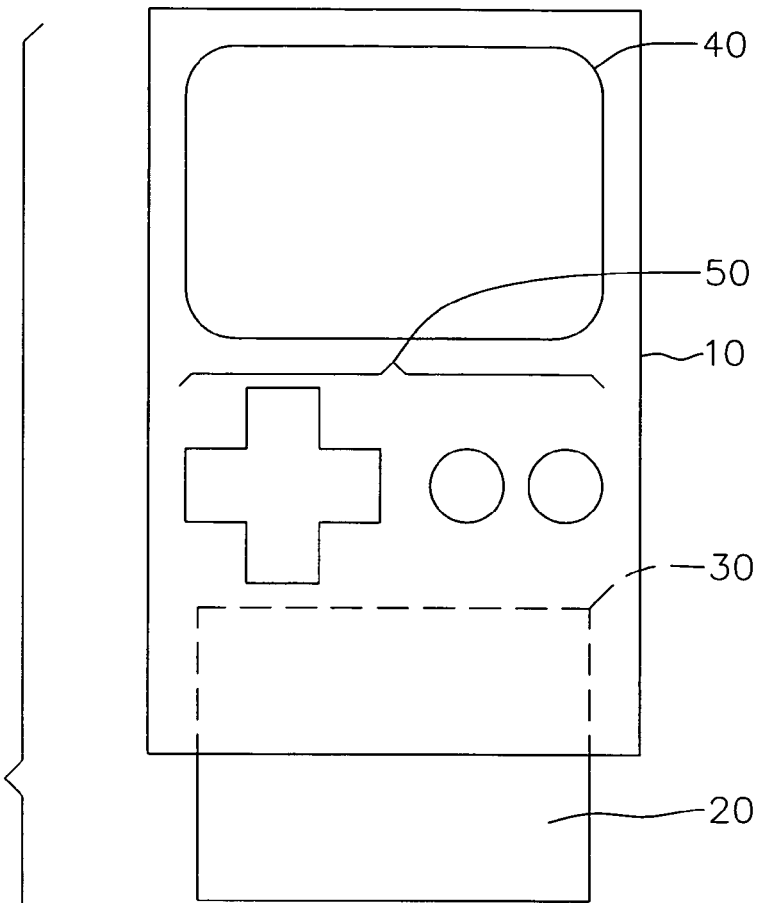
FIG. 1 illustrates a typical known handheld portable game player.
Figure 1:
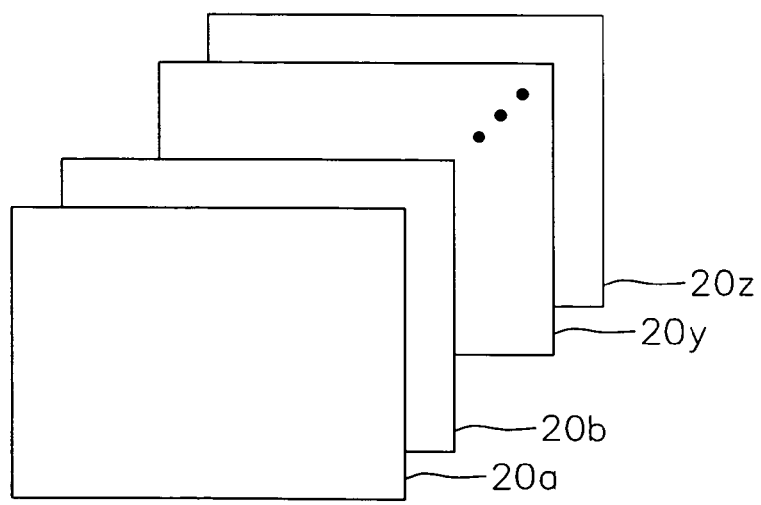

FIG. 1 shows the overall configuration of an embodiment of the invention. Game player 10 is a portable, battery operated computer device that allows a user to play any of a large number of games that are stored on various different cartridges 20. Game player 10 includes a socket 30 into which a cartridge 20 selected by the user from any of a number of cartridges 20a-20. The game player 10 includes a screen 40 on which the game player 10 displays the game and keys 50 that allow the user to provide inputs into the game to interact and thus "play" the game. Although the invention may apply to any portable game player or other device with a screen, in the preferred embodiment, game player 10 is a Nintendo Game Boy Advance (GBA). Game Boy and Nintendo are trademarks of Nintendo of America Inc.

Figure 2:
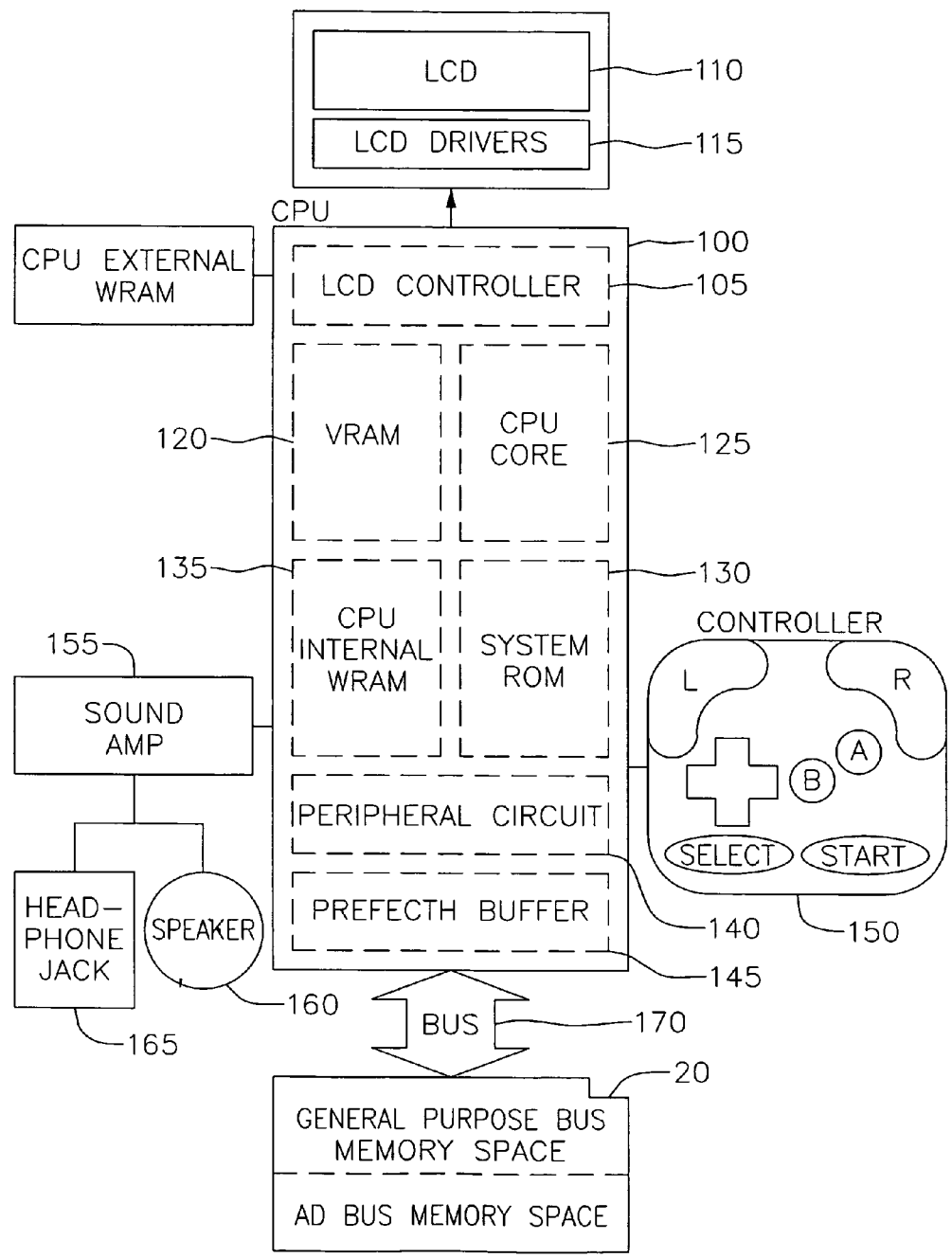
FIG. 2 is a block diagram schematic of an exemplary handheld portable game player.

FIG. 2 shows a more detailed, but general overview of the architecture of a GBA. The GBA has a CPU 100. The processor in the GBA is an ARM processor running at approximately 17 MHz. The CPU includes an LCD controller 105. LCD controller is connected to LCD screen 110 through LCD Drivers 115. In the GBA, the LCD screen 110 is a 240×160 TFT Color LCD capable of 32,768 displayable colors. The LCD Drivers receive an RGB signal from CPU 100. The CPU includes VRAM 120, which is video RAM for storing a digital representation of the screen upon which the RGB output to the LCD driver is based. The CPU also includes CPU Core 125, system ROM 130, CPU Internal WRAM 135, peripheral circuit 140, and prefetch buffer 145. Peripheral circuit 140 connects the CPU to the controller (keypad) 150 and the sound amp 155, which in turn drives speaker 160 and headphone jack 165. Prefetch buffer is a small memory buffer that is used to transfer data between the game cartridge 20 and the CPU 100 though bus 170 that includes the connection between the multi-contact socket in the GBA (not shown) and the multi-contact contacts on the edge connector (not shown) of game cartridge 20. Game cartridge 20 includes memory that typically includes both Masked ROM (not writable) (MROM) and flash memory. Conceptually, the memory is split between General Purpose Bus Memory Space 175 and AD Bus Memory Space 180 (the later memory space is not contained in Game Boy cartridges for use with Game Boy versions prior to the GBA.

Figure 3:
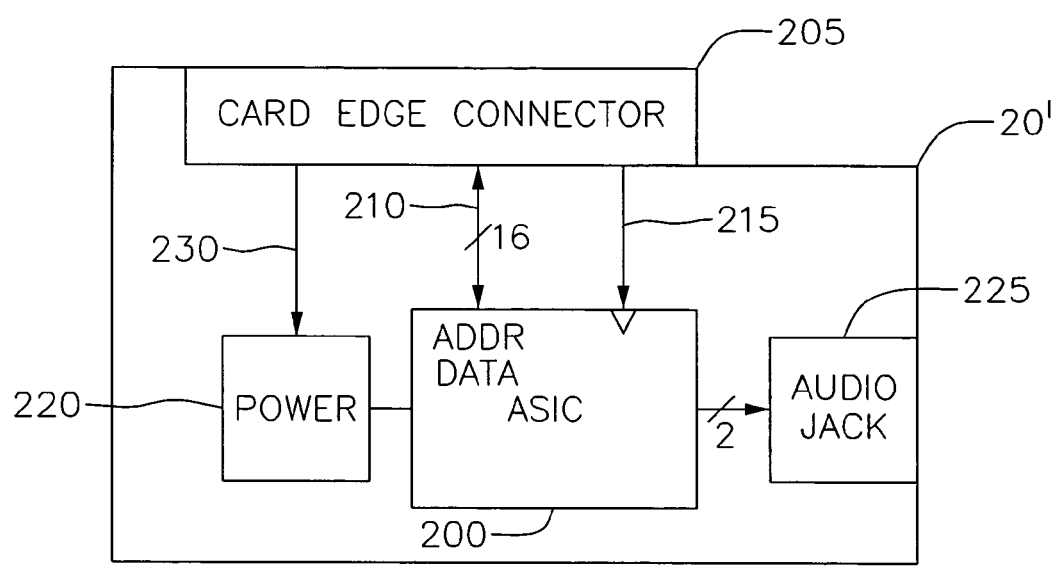
FIG. 3 is a block diagram schematic of a digital media cartridge according to an embodiment of the invention.

One embodiment of the invention includes a digital media cartridge (DMC) 20' for use with the GBA. Referring to FIG. 3, the central component of DMC 20' is ASIC 200. As is discussed in more detail below, ASIC (Applications Specific Integrated Circuit) 200 is a custom made chip that includes, among other things, a processor and memory. ASIC 200 is connected to multiple contacts on edge connector 205. These contacts connect to the combined address/data bus 210 and the control line(s) 215 of the ASIC. The edge connector also includes a power source connection 230 from the GBA. The power goes through power circuitry 220. In one embodiment, the DMC 20' also includes its own audio headphone jack 225.

Figure 4:
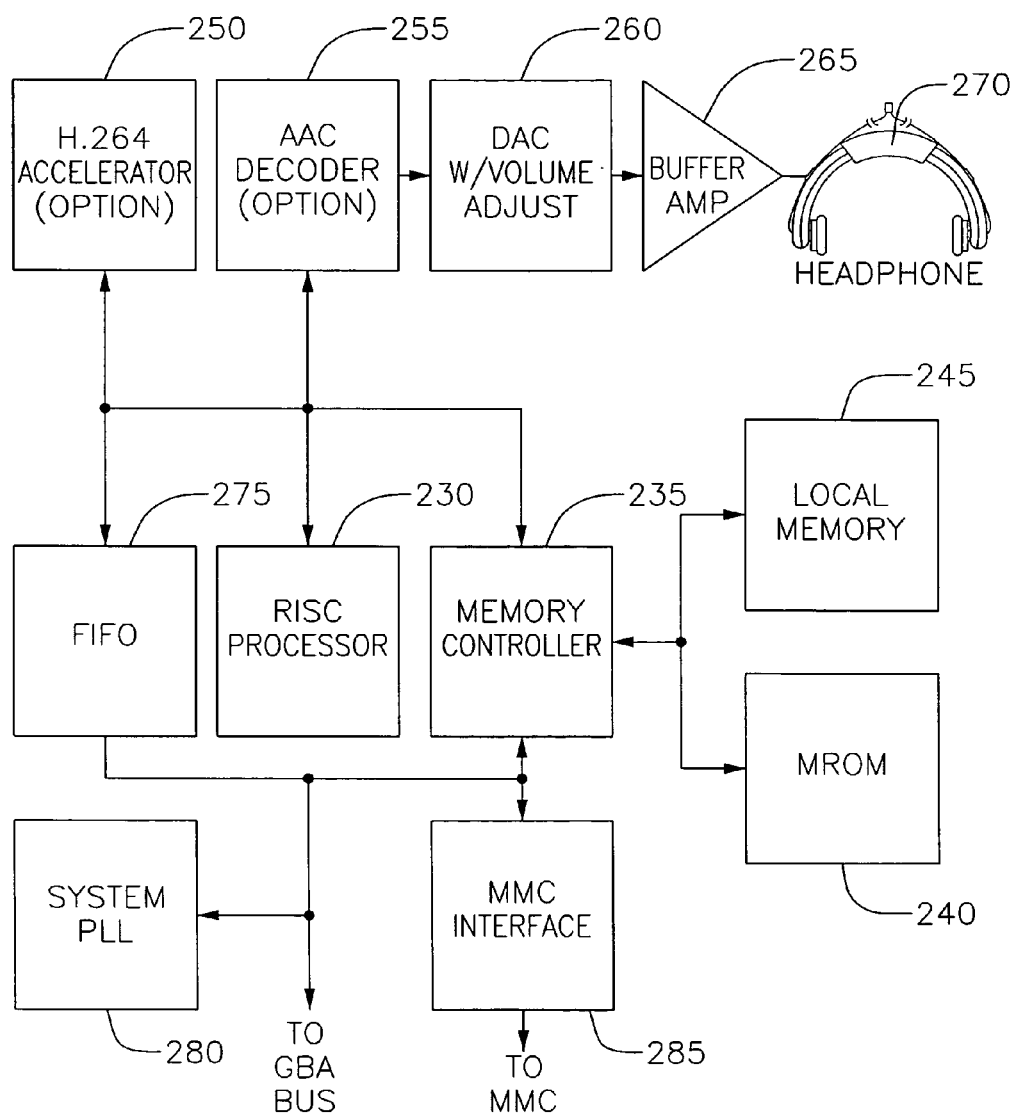
FIG. 4 is a block diagram schematic of an ASIC chip of a digital media cartridge according to an embodiment of the invention.

A more detail block diagram of the architecture of ASIC 200 is shown in FIG. 4. Unlike conventional game cartridges, ASIC 200 includes a processor 230. In one embodiment, the processor 230 is a RISC (Reduced Instruction Set Computer) processor. Processor 230 is connected to a memory controller 235 which interfaces between the processor 230 and the read only Mask ROM (MROM) 240 and writeable Local Memory 245. Digital media content is store on MROM 240. Digital media content can be any type of audio/visual, text or graphics media content, but in a preferred embodiment, the digital media content is full motion video with accompanying audio. In order to be able to store a sufficient quantity of sufficiently quality video in the relatively small memory that is typically found in game cartridges for space and economic reasons, both the audio and video are stored digitally in a compressed format. In one embodiment, H.264 compression is used. While it is possible to real-time decompress video data compressed using H.264 using software and the general purpose processor 230, this generally takes more processor power than it would generally economically and size feasible for a game cartridge at the time of the invention. Accordingly, in a further embodiment, ASIC 200 includes circuitry for real-time hardware H.264 decoding (H.264 accelerator 250). Similarly, in one embodiment, audio is compressed using MPEG-4 AAC encoding and in an alternative embodiment, ASIC includes hardware MPEG-4 AAC decoding circuitry 255. AAC decoding circuitry is connected to a buffer amp 265 that drive headphones 270 through DAC (digital to analog converter) 260. DAC 260 includes volume adjusting circuitry that is used rather than the volume control on the host GBA. During audio and/or video playback, decompressed audio/video data is transferred to the GBA through FIFO buffer 275. However, during boot, of the GBA, data is delivered to the GBA from MROM 240. This is because MROM 240, besides storing the digital media data, stores a boot program that runs on the GBA processor to allow the RISC processor 230 on the DMC to directly control the screen and audio outputs of the GBA.

In one embodiment, the ASIC includes the MROM containing all of the digital audio/video data (all-in-one embodiment).

In another embodiment, the ASIC contains a much smaller MROM, that stores the boot program, but not the digital audio/video data. In this embodiment, DMC has a second connector, besides the connector to the GBA, that connects the ASIC 200 to digital media data stored in an MROM in a sub-cartridge that is removable from the main DMC that includes the processor (sub-cartridge embodiment). In one embodiment of the sub-cartridge embodiment, the connector is a MultiMedia Card (MMC) socket that is connected to MMC Interface 285. Alternatively, the sub-cartridge can be in any existing form factor and their respective connectors, such as, PCMCIA cards, smart cards, Secure Digital (SD), SmartMedia, Compact Flash or Memory Stick. Additionally, sub-cartridges can be made in form factors and connectors that are less common or have not yet been developed.

One possible advantage of the sub-cartridge embodiment is that the cost of the sub-cartridge may be lower than the price an all-in-one DMC that includes both the processor and the memory with the digital audio/video data. On the other hand, an advantage of the embodiment, in which the digital audio/video data is stored directly in MROM on the same ASIC as the processor, is that there are no exposed leads directly from the MROM containing digital media that may allow someone to more easily try to reverse engineer the system and try to copy off the raw compressed digital audio/video data directly from the MROM. Further, it prevents the use of Game Boy emulators or other hardware devices to electronically download the data in the memory because they must go through the ASIC's processor to get to the memory, which blocks such access. Another advantage of the single chip ASIC system is that, unlike a cartridge (adapter) and sub-cartridge system, the hardware (e.g., processor, audio and/or video decoders) can be changed between different versions of the chip without affecting the operation of DMCs produced prior to this invention. Accordingly, better compression that requires less memory for the same length of video may be employed in later DMCs, saving cost on the size of MROM that must be included in the ASIC. Similarly, new technology may become available, such as high-definition television, in which changes to the processor, video decoder, etc. can be made to produce DMCs that produce higher resolution video, without affecting prior cartridges in any way.

The ASIC uses the system PLL from the host GBA as a clock. However, during initial boot of the GBA, the GBA does not supply such a clock to the cartridge in the Game Boy's cartridge slot. Accordingly, the memory controller in the ASIC must be capable of getting through the GBA boot sequence without an external clock.

Figure 5:
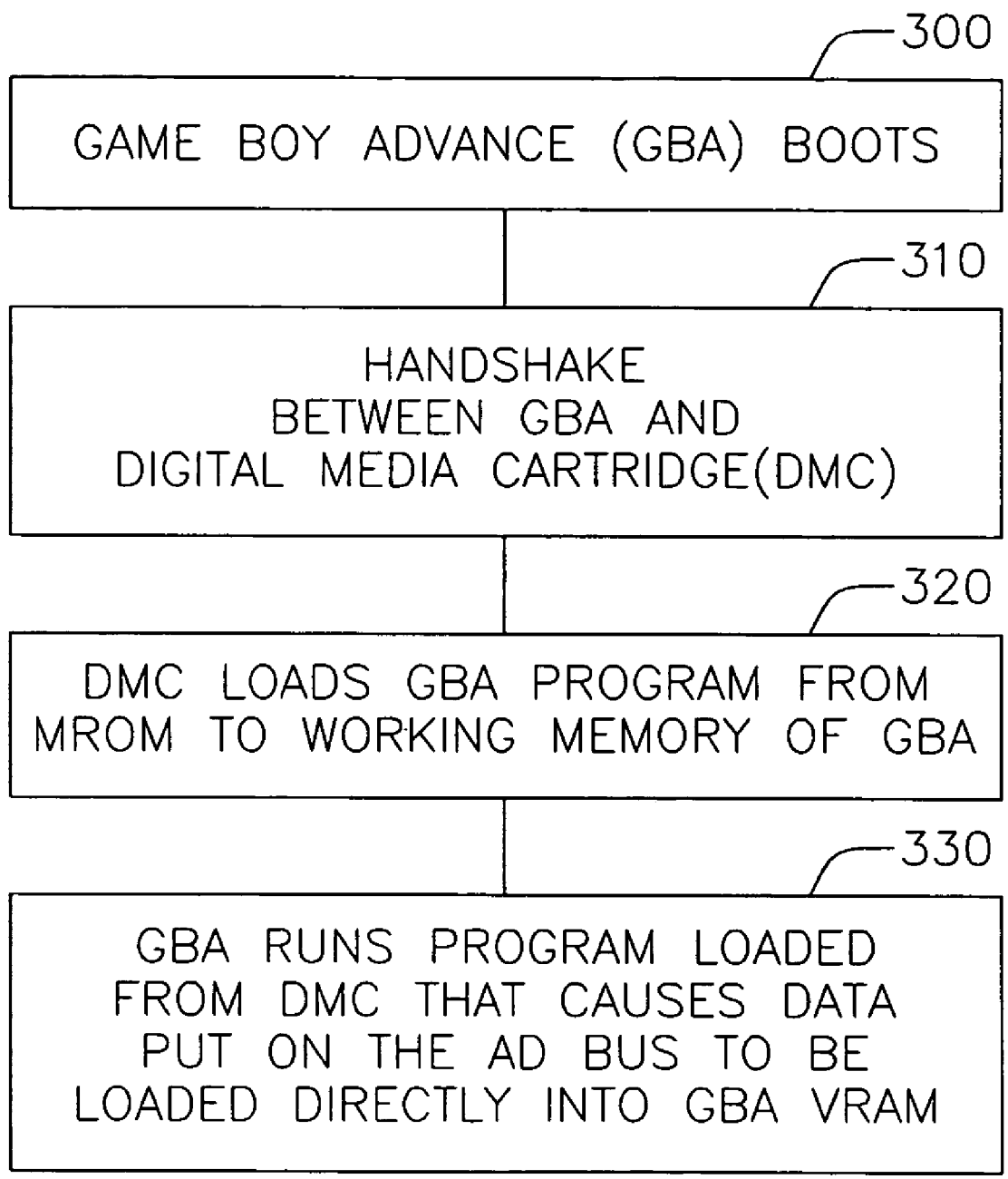
FIG. 5 is a flow chart showing the process of interaction between a game player and a digital media cartridge according to an embodiment of the invention.

FIG. 5 shows the process used by the DMC in interacting with the GBA to accomplish displaying video on the LCD screen of the GBA. In step 300, with the DMC 20' connected to the cartridge socket in the GBA, the GBA is powered on and the GBA goes through its standard boot sequence. This boot sequence includes, in step 310, authentication of the DMC as a legitimate GBA cartridge. In step 320, the DMC loads a GBA program stored in the MROM of the DMC via bus 170 into the working memory of the GBA. In step 330, the GBA then runs the uploaded program from the DMC. This program causes the GBA processor to pass data presented with the correct command(s) on bus 170 directly to the VRAM 120 of the GBA without any processing, and thus delay, by the GBA processor. The program also causes the GBA to pass any user inputs received from controller 150 directly to the DMC processor 230 without taking any action on the user inputs. The DMC processor 230 then processes the user inputs and performs the programmed response to such user inputs, such as play, pause, fast forward, rewind, menu, select and cursor control.

Figure 6:
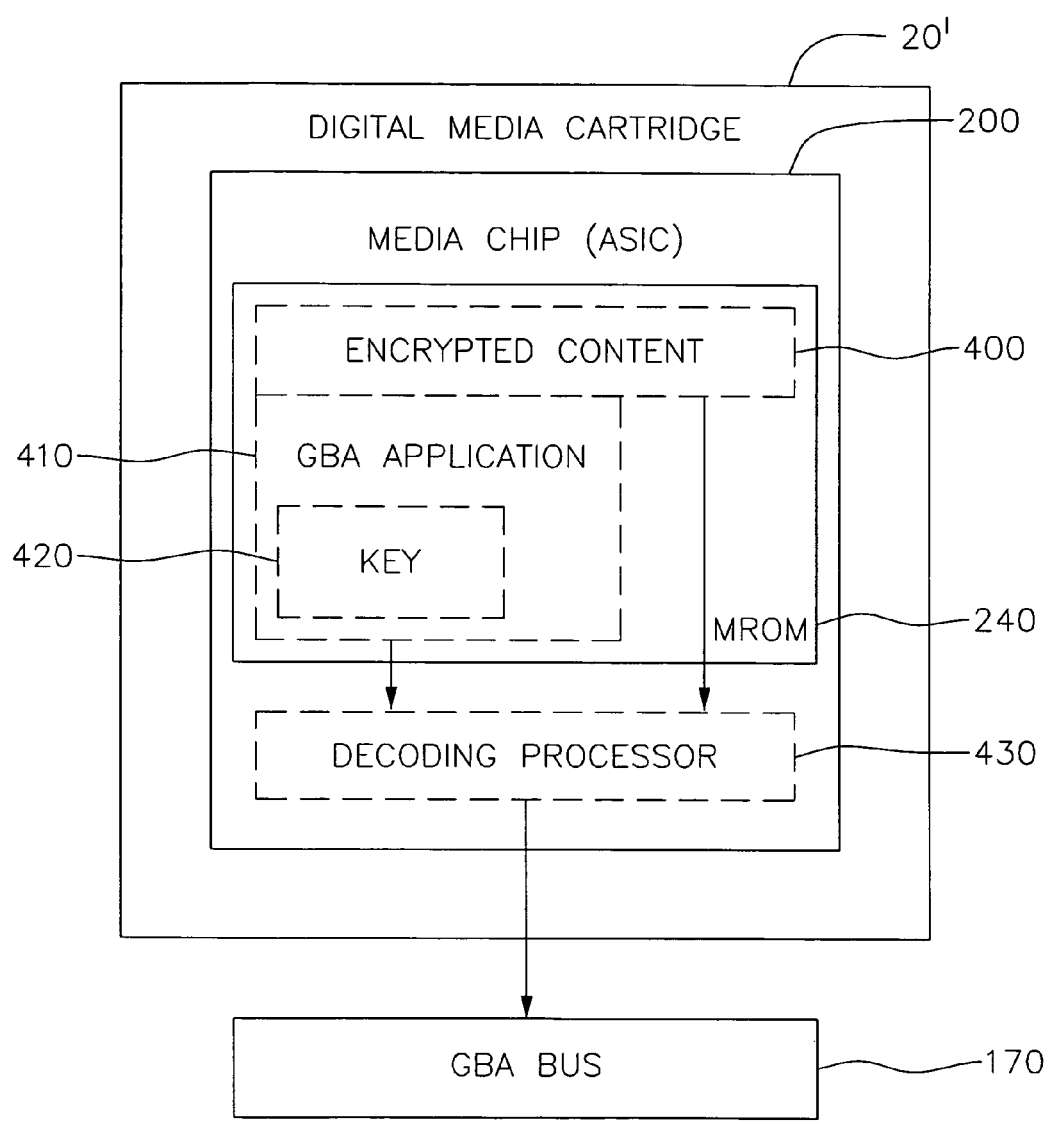
FIG. 6 is a block diagram schematic of a decryption portion of a digital media cartridge according to an embodiment of the invention.

Turning to FIG. 6, in an alternate embodiment, encryption is used. FIG. 6 shows a block diagram of DMC 20', the ASIC 200 and MROM 240 that is shown as part of ASIC 200. As discussed above, though, MROM 240 can be implemented on a separate chip or even a separate sub-cartridge from ASIC 200. The MROM includes encrypted digital media data (encrypted content) 400 and the program that is loaded onto the GBA and run by the GBA CPU 100, the GBA application 410. The GBA application includes a decryption key 420. The ASIC includes a hard coded decoding processor 430 that is passed the decryption key 420 by the GBA CPU 100 running the GBA application 410. Alternatively, the decoding processor is implemented with the RISC processor running either software (stored in MROM) or firmware (e.g., microcode). The GBA application does not contain any information about the decryption algorithm built into decoding processor 430, and thus the key alone does not help a hacker in decrypting the encrypted content 400. Alternatively, the key is not passed to the GBA as part of the GBA application, but rather stored separately, either in the MROM 240, firmware or hardwired in the ASIC and supplied directly to the decoding processor without ever being exposed to the GBA bus 170.

In the all-in-one embodiment that includes the RISC processor and MROM in the same DMC, the ASIC for each title of video content contains slightly different decrypting algorithms built into the decoding processor. Thus, even if one decoding processor is reverse engineered, the knowledge gained will not be useful in using the key for any other title to decrypt the other title. Further, as new encryption technology or techniques are developed, these can be implemented in future titles releases because, being an all-in-one cartridge, the DMC does not have to be backward compatible with any old decryption hardware, unlike technologies like DVDs where the decryption scheme cannot be changed without rendering new DVDs unplayable on old DVD players.

The DMC is not limited to outputting audio and video. In an alternate embodiment, the MROM of the DMC contains software that is executable by RISC processor 230, such as games. One instance where this embodiment may be desirable is if the processor or other hardware in the GBA is not capable of some function or is not fast enough to run certain game software that can, though use the screen 110 and the control keys 150 of the GBA. As with the audio/video embodiment described above, the DMC takes control of the GBA screen by directly loading data into the GBA VRAM and is passed all GBA control key presses.

In another alternate embodiment, the MROM of the DMC contains game system emulation software. When this is run by the RISC processor 230, the DMC then acts like another game system entirely. For example, the game system emulation software may emulate the original Nintendo Entertainment System (NES), which is a cartridge based game system first introduced in 1985 that is not portable and does not contain its own screen, but is connected to a television and uses an external power supply. When the RISC processor is running the NES emulation software, the DMC with the GBA operates exactly the same as the original NES system, using the GBA's screen 110 and controller 250. The MROM also contains software of one or more original or new NES games. The GBA/DMC then allows a user to play a true NES game as they would on an NES system.

In a sub-cartridge alternate embodiment, the DMC includes a socket that accepts other cartridges that contain NES system games. As with the sub-cartridge embodiment described above, the sub-cartridge can be of any form factor and use any type of connector, such as, for example, a socket connected to MMC interface 285. Another sub-cartridge example is a socket, connected to the DMC by a cable or wireless link because of the socket's size, that accepts the original cartridges for the game system being emulated by the DMC. Thus, if someone still owns original NES cartridges, they could be connected and played on an NES emulator DMC cartridge plugged into a GBA.

While the above embodiments have been discussed in relation to portable game players, the system is not so limited. Rather, for video content, the system can be applied to any system that already has a screen, a user input and a connector that allows access by the DMC to the screen and the user input. Similarly, for audio only content, the system can be applied to any system that already has a speaker, a user input and a connector that allows access by the DMC to the speaker and the user input.

For example, it would be inexpensive to have television built with a socket through which a DMC could be connected to provide video directly to the screen of the television. Typically, no or very little additional circuitry would be required. In such a system, a DVD player or video tape player would not be needed to view prerecorded video content. However, unlike DVD and video tape, which must work with the technology as it was essentially when the product first came to the market, DMCS, because they include all of the video generation electronics, the quality and technology level of a particular DMC is based on the technology available and the economics available at the time the DMC was produced, even many years after introduction of DMCS. For example, because of memory costs, compression technology and other factors, it is likely not presently economical to produce a DMC that produces high-definition (HD) quality video. (High Definition television is presently defined in the United States as having either 1080 vertical lines of resolution, interlaced (1080 i) or 720 vertical lines of resolution, progressive scanned (720 p)). Thus, an HD-capable television with a socket to accept DMCs would show the video at whatever quality (resolution and frame rate) that is produced by that particular issue of DMC. When memory costs and technology advances to the point where producing a DMC that outputs true HD quality video signals, The same HD-capable television would show the video produced by the new DMC in HD quality. The only limitation would be the quality of video that the television is capable of reproducing. Alternatively, DMC sockets can be provided in any other consumer device, including, but not limited to, VCRs, DVD players, DVD recorders, digital video recorders or cable or satellite set top boxes.

One difference between the GBA embodiment and, for example, the television embodiment, is the format of the video output by the DMC. As described above, in the GBA embodiment, the video is output in digital form across bus 170 to VRAM 120, which drives the LCD screen 110. In the case of a television or similar device, the DMC may include a digital to analog converter (D/A converter) (not shown) that converts the digital video generated by the processor and/or the H.264 Accelerator into an analog video signal, such as NTSC baseband video and output the analog video through the DMC's connector. Indeed, many television and other home entertainment components include (mostly analog) inputs on the front of the device. It is an inexpensive manufacturing also include a jack that included the same analog video connectors as well as power, user input passthroughs and, in some embodiments, a clock signal.

Besides cost issues, another reason to have the DMC output analog video rather than digital video is to guard against piracy. Using existing home recording technology, recording of analog signals degrades the quality of the video, at least slightly and in some cases dramatically. Digital video being output by the DMC runs the risk of being sniffed or intercepted at the connection between the DMC and the television to achieve a perfect copy of the video output by the DMC. Further, existing VCRs and DVD recorders include circuitry and/or software that can detect modifications to the analog video signal that are intentionally placed in prerecorded video tapes, DVDs and some broadcast television programs that prevent effective recording of the video signal. In one embodiment, the DMC inserts these modifications to the video signal as part of the D/A process.

Other embodiments other than game players and televisions that can be equipped with DMC sockets include, but are not limited to: personal digital assistants (PDAs), such as Palm or PocketPC operating system devices, e-books, mobile phones, wireless email devices, desktop and laptop computers, automobile video systems, display projectors, video camcoders, digital still cameras, video game consoles and any other current or future product that includes a screen and an user input device.

When used with devices like mobile phones or other devices that either have ID numbers or are connected to wide area networks, the decryption process can be more robust. As in the embodiment discussed in FIG. 6, a key is passed to the host device, for example, a mobile phone, rather than a GBA. However, since the mobile phone is connected to a wide area network, authentication with an authentication server on the network and/or distribution of secondary keys from an authentication server is done, allowing many types of known encryption to be used, including, but not limited to, public key, private key encryption methods. In one alternate, the operation of the DMC or the output of the DMC is altered based upon the ID in the host device and/or the key(s) returned from the network. For example, video or audio output can be watermarked. A watermark can be used to determine if, how and to what devices the video or audio output can be copied. If a watermarked video or audio is copied and distributed improperly, the host device used originally can be determined.

In an alternate embodiment, DMC 20' includes both MROM 240 and flash memory (not shown). This embodiment allows the downloading and storage (after the DMC is removed from the host device) of any data that otherwise has been described as being stored in MROM 240, such as, for example, audio/video content, games, game system emulation software, or other software. It can further store patches and updates to any operating or system software run by the RISC processor 230. When used with the sub-cartridge embodiment, audio and/or video content, games or any other data or software can be downloaded from the sub-cartridge to the flash memory, allowing this content to be enjoyed after the sub-cartridge is removed from the DMC. When used with the embodiment where the host device is connected to a wide area network, audio and/or video content, games or any other data or software can be downloaded over the wide area network and stored in the flash memory. When used with a host device that has an input/output (I/O) port, such as a USB or 1394 port, audio and/or video content, games or any other data or software can be downloaded from a device connected to the host device's I/O port and stored in the flash memory.

In an alternate embodiment, DMCs include there own user input device, such as a keys or some wireless input such as infrared or RF, such as Bluetooth.

Figure 7:
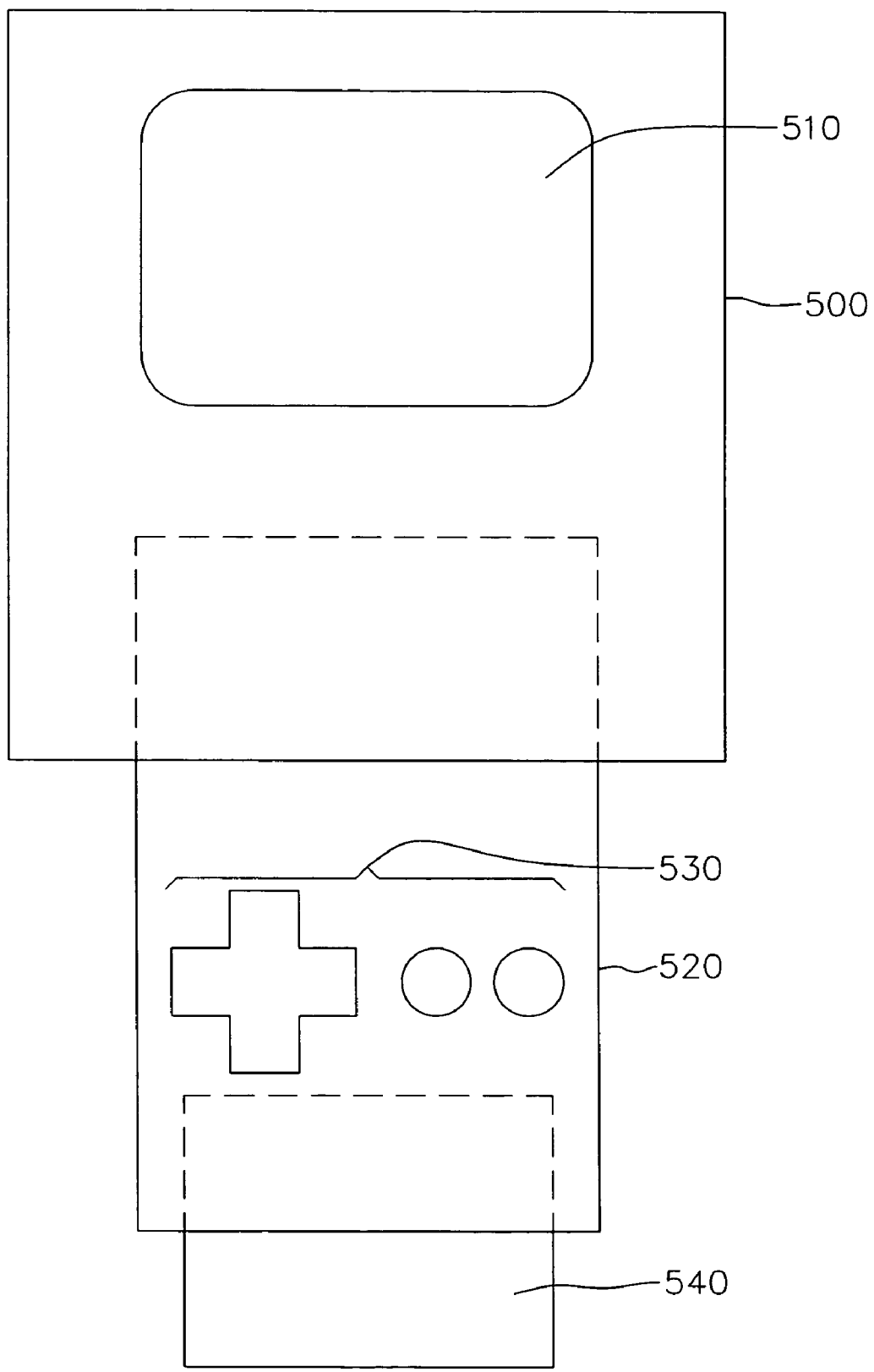
FIG. 7 is a block diagram schematic of a digital media cartridge with a intermediate sleeve with user input controls according to an embodiment of the invention.

Turning to FIG. 7, a similar alternate embodiment includes a host device 500 that has a display screen 510 and includes any device that can be made to accept DMC 20' as described above. The host device may be a television or any other device with a display screen that does not include appropriate user inputs. The host device 500 includes a socket that accepts user input cartridge 520 that includes control keys 530. The user input cartridge 520 also includes a socket that accepts a DMC 540. Other than supply signals alerting DMC 540 identifying control keys presses, user input cartridge generally just passes signals unimpeded between DMC 540 and host device. DMC 540 is generally the same as and operates the same as DMC 20'. As with DMC 20', DMC 540 can store and output audio/video programs, in which case the control keys perform such functions as play, pause, fast forward and reverse and/or run video games or emulate game systems, in which case the control keys perform the function of a game controller.

Audio only DMCs can be used with, for example, MP3 players, audio cassette tape player, audio CD player, earphone, headphone, an audio amplifier or audio receiver that is equipped with a DMC socket through which the DMC can directly access the speakers or headphones of the device.

In another alternate embodiment, rather than a physical socket and edge connector as used by the GBA system, the communication between the DMC and the display or audio reproduction device is a wireless connection, such as infrared, RF, microwave or any other wireless communication technology. In an alternative to this embodiment, a wireless adapter could be used to connect a socket based DMC with a display or audio reproduction device that is equipped to receive DMC output wirelessly.

In another alternate embodiment, the form factor of the DMC is different. Rather than using a GBA cartridge format and edge connector interface, the DMC is adapted to be packaged in any existing form factors and their respective connectors, such as, PCMCIA cards, smart cards, MultiMedia Cards (MMC), Secure Digital (SD), SmartMedia, CompactFlash or Memory Stick. Additionally, DMCs can be made in form factors and connectors that are less common or have not yet been developed. As with the DMC for use with the GBA, the DMC implemented in any of these form factors can be an all-in-one cartridge that includes the decompression and decryption processors or a cartridge and sub-cartridge combination where the cartridge includes the processors and the sub-cartridge includes the compressed digital audio/video data. In one cartridge—sub-cartridge implementation, the cartridge is built in a sleeve form so that one end fits into the socket for the particular form factor and the other end includes a socket for accepting a sub-cartridge of the same form factor. In one embodiment, the sub-cartridge can be a standard, off the shelf memory card of the chosen form factor with the compressed, encrypted digital video data stored in the standard way on it. In yet another embodiment, the form factor DMCs include a small audio output jack, preferably at or near the end away from the connector of the cartridge. Alternatively, the DMC has a wireless transmitter (infrared or RF, for example) to transmit the audio signal produced by the DMC and/or the video signal produced by the DMC to wireless equipped display and/or speakers/headphones, respectively.

Various alternate embodiments have been described as well as examples of specific alternates being combined. However, it is recognized that, for the most part, each of the alternate embodiments may be combined with one or more of the other embodiments and all of these combination are contemplated and intended, even each of the enormous number of combinations are not specifically discussed.

The present invention has been described and is illustrated with respect to embodiments thereof, it is to be understood that it is not to be so limited, since changes and modifications may be made therein which are within the full intended scope of this invention as hereinafter claimed.

What is claimed is:

1. A cartridge for use with a host display device that includes a video display and an external electrical connection that is connected to the video display, the cartridge comprising:
   a connector that electrically connects to the external electrical connection;
   a memory storing an encrypted compressed digital representation of a video signal and computer code to be executed by the host display device;
   a decompression processor connected to the memory;
   a decryption processor connected to the memory; and an interface processor connected to the memory, the decompression processor, the decryption processor and the connector;

wherein the interface processor uploads the computer code to the host display device instructing the host display device to pass video signals output via the connector to the video display; and wherein the decompression processor, decryption processor and the interface processor convert the encrypted compressed digital representation of a video signal into a video signal that is output to the host display device via the connector.

2. The cartridge of claim 1 wherein a single integrated circuit comprises the decompression processor, the decryption processor and the interface processor.

3. The cartridge of claim 1 wherein a single integrated circuit comprises the memory, the decompression processor, the decryption processor and the interface processor.

4. The cartridge of claim 1 wherein the memory stores an encryption key used by the decryption processor to decrypt the encrypted compressed digital representation of a video signal.

5. The cartridge of claim 4 wherein the decryption processor includes at least a portion of a decryption algorithm.

6. The cartridge of claim 5 wherein the encryption key is only effective if used with the portion of a decryption algorithm included in the decryption processor.

7. The cartridge of claim 1 wherein a single processor comprises two or more of the decryption processor, decompression processor and the interface processor.

8. The cartridge of claim 1 wherein user inputs received by the host display device are received by the interface processor through the connector.

9. The cartridge of claim 1 further comprising an audio decoder connected to the memory and the decryption and decompression processors.

10. The cartridge of claim 9 further comprising an audio output jack connected to the audio decoder.

11. The cartridge of claim 4 wherein the encryption key is communicated from the host display device to the cartridge.

12. The cartridge of claim 11 wherein the encryption key communicated to the cartridge is retrieved by the host display device through a network.

13. The cartridge of claim 1 further comprising a processor for executing video game programs connected to the memory and the decryption and decompression processors.

14. The cartridge of claim 1 further comprising a digital video decoder connected to the memory and the decryption and decompression processors.

15. The cartridge of claim 1 wherein electrical power is received by the cartridge from the host display device through the cartridge connector.

* * * * *